United States Patent [19]

Granger

[11] Patent Number: 4,923,548

[45] Date of Patent: May 8, 1990

[54] PROCESS FOR THE PRODUCTION OF LEAD-BASED CAPPING CAPS AND THE CAPS OBTAINED

[75] Inventor: Jacques Granger, Libourne, France

[73] Assignee: CEBAL, Clichy, France

[21] Appl. No.: 382,583

[22] Filed: Jul. 20, 1989

[30] Foreign Application Priority Data

Jul. 28, 1988 [FR] France ............................ 88 10451

[51] Int. Cl.$^5$ ............................................. D02G 3/00
[52] U.S. Cl. ............................. 156/182; 156/244.11; 156/245; 428/461
[58] Field of Search ............... 156/182, 244.11, 244.23, 156/244.27, 245; 215/324, 326, 347, DIG. 2; 413/9, 18; 428/461

[56] References Cited

U.S. PATENT DOCUMENTS

| | | | |
|---|---|---|---|
| 3,832,963 | 9/1974 | Gayner et al. | 413/18 X |
| 4,071,391 | 1/1978 | Haberstroh | 428/461 X |
| 4,370,388 | 1/1983 | Mito et al. | 428/461 |
| 4,452,842 | 6/1984 | Borges et al. | 215/347 X |
| 4,769,514 | 9/1988 | Tadayuki et al. | 428/461 X |

Primary Examiner—David Simmons
Attorney, Agent, or Firm—Dennison, Meserole, Pollack & Scheiner

[57] ABSTRACT

The invention relates to a process for the production of a lead-based capping cap, in which preparation takes place by rolling of an alloyed lead metal strip covered on each of its two faces by an alloyed tin film, characterized in that a multilayer plastics material strip is prepared having an adhesive plastics material surface layer and at least two successive layers of a plastics material from the group of polyolefins, grafted polyolefins and terpolymers; the two strips are joined by applying the adhesive face of the plastics material strip to one of the two faces of the metal strip, thus giving a complex strip, and from said complex strip is cut a blank and the latter is converted into a cap internally coated with plastics material. The invention also relates to the capping caps, or cap overseals, obtained, internally having at least two plastics material layers. These caps are used for over-capping the corks of wine, alcohol or spirit bottles. Their internal coating prevents lead migration into the bottle contents in use and makes it possible to reduce the lead weight of the caps.

14 Claims, No Drawings

PROCESS FOR THE PRODUCTION OF LEAD-BASED CAPPING CAPS AND THE CAPS OBTAINED

The invention relates to a process for the production of lead-based caps or seals, typically used for capping or sealing wine bottles corked with a cork completely inserted in the neck or for the capping of alcohol or spirit bottles corked with a cork, whose head projects above the neck. The invention also relates to the capping caps obtained.

It has been found that these capping caps, typically produced by drawing and ironing or by flow-spinning from a Pb+1% Sn alloy strip coated on its two faces with a small thickness of tin did not completely prevent the migration of lead into the wine.

It was found that when using such caps there were accidental migrations of a little lead into the wine, particularly because the tin film on the interior of the cap has microscopic discontinuities exposing the lead and the locally uncoated lead is attacked by acetic acid resulting from the oxidation of the ethyl alcohol of the wine. Moreover, the actual tin is attacked in the presence of oxygen by the fruit acids contained in the wine, which worsens the aforementioned process.

The Applicant has attempted to develop a capping cap based on lead making it possible to prevent such lead migrations and having an acceptable cost.

DESCRIPTION OF THE INVENTION

The object of the invention is a production process in which a metal strip is prepared by rolling or lamination, which has an alloyed lead core with a Pb content above 95% and covered on each of its two faces by an alloyed tin film with a Sn content exceeding 80%. According to the invention, the following operations are also performed:

(a) a multilayer plastics material strip is prepared, which consists of an adhesive plastics material surface layer and at least two successive layers of a plastics material from the group of polyolefins, grafted polyolefins and terpolymers;

(b) the two strips are joined by applying the adhesive face of the plastics material strip to one of the two faces of the metal strip, thus giving a complex strip;

(c) from said complex strip is cut a blank and is converted into a cap internally coated by a plastics material by drawing and ironing or by flow-spinning.

Tests were firstly carried out in connection with the increase in the thickness of the alloyed Sn present on each of the faces of the alloyed lead and it was found that even on increasing said thickness by 3, it was not possible to remove on the rolled metal strip and therefore the caps the microscopic discontinuities or absences of the alloyed Sn coating exposing the lead. The rolled metal strips have a thickness between 0.10 and 0.60 mm and usually in the case of caps for capping wine bottles between 0.10 and 0.25 mm. The alloyed Sn facing, although having a very limited thickness of approximately 0.8% of the alloyed lead blank thickness on each face of said blank, makes it possible to prevent cracking and fracturing during rolling, although the alloyed Sn coating is incomplete at the end of the process. Thus, an increase in the alloyed Sn thickness adequate for eliminating the discontinuities was found to be economically unacceptable.

Complex strips were then prepared by calendering portions of a metal strip with multilayer plastics material strips having an EAA adhesive layer and either 1, or 2, or 3 PE layers, said strips being prepared by coextrusion, sometimes associated with a calendering process. The tests then carried out on the complex strips related to two important groups of problems for capping caps, namely (1) the suitability of the strips for drawing and ironing in the form of caps and the suitability of the latter for crimping onto a bottle neck;

(2) the sealing of the coating of the caps obtained during use and in particular the absence of Pb migration into the wine.

The following observations were made, as will be illustrated by the tests. In the case of a single 10 μm thick PE coating, there is an inadequate capacity for drawing and ironing. This shaping comprises stamping and diameter reduction passes (arrangement in stages of the profile) in a successive manner, followed by stretching passes with respect to the skirt, which are particularly difficult because they lead to an elongation of more than 40% on an already cold worked structure. More than 20 production tests on caps having a single PE layer revealed that the internal coating thereof tore during the stretching stage, no matter whether or not the inner surface or side of the punch was lubricated.

In the case of two PE layers in each case of 10 μm, both with two PE layers having an intermediate layer or core of 10 μm and a surface layer with a thickness of 5 μm, the drawing and ironing behaviour, proved on more than 20 tests in each case, was found to be satisfactory in the case when the inner PE surface remained dry. When the liquid drawing and ironing lubricant was used for the interior, the results were poor, so that the obviating of a lubrication is an important preferred condition. The caps with two PE layers also behaved well during the crimping tests onto bottles, said crimping consisting of applying the cap to the neck passing downwards beyond the shoulder of its ring and accompanied by variable reductions in the local diameter of the cap as a function of the locations and generally being equal to or below 1.5 mm. The same good behaviour is obtained with three PE layers. It is assumed that this surprising good behaviour on using two layers could be linked with the elastic microdeformation of one PE layer compared with the other, even when said layers are joined by coextrusion, said microdeformations making it possible to compensate the deformation and friction differences of the inner and outer materials with respect to contiguous tools.

Moreover, electric porosity tests and tests of the Pb migration into the wine revealed that the caps with an internal coating having two PE layers give a better protection than caps internally coated with a single PE layer. The migration of the Pb into the caps with two PE layers is 100 to 500 times less than in the case of caps without an internal coating and the caps with the two layers give an effective protection in use for more than five years. Two PE layers are not equivalent to a single PE layer with twice the thickness and it is possible that the effects of the surfaces forming a barrier and the displaced facing structures of the two PE layers have a predominant effect.

GB-A-713 634 describes the production of a complex having a thin film of Al, pure Sn, or Sn with 3% Sb, or Pb coated with Sn and which is coated with polyethylene, and has the advantage of PE in this complex for providing protection against the corrosion of the underlying metal by corrosive substances packed in said complex, e.g. in the case of bottle cap joint coatings. However, the knowledge of the Pb/Sn/PE combination does not make it possible to arrive at the present invention, in which the alloyed Sn coatings are not tight, so that they have little or no effect with regards to corrosion, and in which the complex obtained must be able to withstand the shaping into a cap and then durably prevent lead migrations into the wine, both of said results being surprisingly obtained on the basis of two PE layers. Bearing in mind the observations made, the invention is extended to the aforementioned similar plastics materials suitable for the same caps or for capping of other types.

Better results were also observed (absence of creasing of the inner surface of the cap) when the surface PE layer remained dry, but when it was of self-lubricated PE, said feature obviously also being of interest for other polyolefins.

The initially prepared plastics material strip having an adhesive layer and two PE layers preferably, for good shaping, economy and for the quality of the coated obtained, has a total thickness between 10 and 40 $\mu$m. The thicknesses of the three layers can vary as follows: adhesive layer 2 to 6 $\mu$m, following PE layer 5 to 30 $\mu$m and surface PE layer 3 to 15 $\mu$m. The surface layer in contact with the drawing and ironing mandrels is preferably of self-lubricated LDPE.

The adhesive material coating of said strip, of EAA in the tests performed, is in one of the materials from the group formed by copolymers of $\alpha$-olefins and an unsaturated anhydride or acid, ionomers, as well as polyolefins grafted by an unsaturated anhydride or acid.

The plastics material coating improves the mechanical strength of the complex strip prepared, which makes it possible to reduce the alloyed lead thickness by 10 to 15% and thus limit the pollution caused by lead when empty bottles are thrown away as domestic refuse.

As an economy measure and as improvements to the corrosion resistance by the alloyed Sn coating are not possible, the Applicant attempted to further reduce the alloyed Sn thickness and surprisingly found that its effect of aiding the rolling operation was maintained despite proportions of discontinuities, exposing the alloyed Pb, reaching 30 to 50% of the surface at the end of rolling. This is the case of a 5 mm thick, alloyed Pb blank colaminated or corolled with on each case a thin 15 $\mu$m thick alloyed Sn strip, i.e. 0.3% of the alloyed lead thickness and up to 0.2 mm thick. The alloyed Sn thickness calculated for each face is 0.6 $\mu$m and discontinues thicknesses of 0.9 to 1 $\mu$m were observed with approximately 40% absences or discontinuities. Thus, the metal strip is preferably produced by colaminating the alloyed lead blank with on each face an alloyed Sn strip with a thickness of 0.2 to 0.5% of the alloyed lead thickness. It was found and this is also surprising due to the proportion of the discontinuities, that the adhesion of the plastics material strip remained good, or at least adequate for the shaping operations. It should be noted that once the cap is shaped and crimped, said adhesion is no longer critical, the important factor for the corrosion resistance then being the efficiency of the protection provided by the inner coating.

The preferred analyses (% by weight) of the metal products converted in the process according to the invention are as follows: alloyed lead: Sn 0.1 to 1.5%; Sb<0.2%; impurities <0.2%; Pb constituting the remainder. alloyed tin: Cu+Ni+Zn>0.2% with Cu<10%-Ni<3%-Zn<3.3%; impurities <0.2% and Sn constituting the remainder.

The plastics material strip is normally joined to the metal strip by hot calendering. In this operation, the facing point must be moved away from the heating zone, in such a way that the surface temperature of the metal strip, which is a relatively poor heat conductor, is not too high for the plastics material, or too low for the bond to be made and is typically between 80° and 130° C.

The plastics material barrier layer or adjacent layer can be coloured without any disadvantage with regards to the shaping capacity of the complex strip, e.g. using a $TiO_2$-based pigment with a content below 10% by weight. This barrier layer, or the plastics material strip incorporating it is advantageously irradiated with an absorbed dose of 0.1 to 2 kgray and preferably 0.3 to 0.8 kgray for improving the ageing resistance and therefore the resistance to Pb migration over long periods (e.g. more than 3 years).

The second object of the invention is the capping cap obtained which, as a result of its shaping method, has a skirt which is thinner than its bottom, e.g. 0.14 mm thick, whilst the bottom is 0.18 mm thick and has the following layers passing from the outside to the inside and without taking account of external decoration:

a Sn-based film, then a Pb-based layer, then a Sn-based film, each of these two Sn-based films having over at least 15% of its surface absences visible with a magnification of 200, leaving the Pb-based layer exposed; then an internal plastics material coating having in contact with the second Sn-based film, an adhesive layer, followed by at least two successive plastics material layers from the group of polyolefins, grafted polyolefins and terpolymers.

This inner plastics material coating of the cap preferably comprises, for economic reasons and to facilitate production, only two PE layers following on to the adhesive layer. Typically, the PE-layer in contact with the adhesive layer has a thickness between 7 and 25 $\mu$m and the surface PE layer a thickness of 3 to 10 $\mu$m, being preferably of low density PE and preferably a self-lubricated quality, the inner coating then having a particularly smooth visible surface.

The process and capping capsule according to the invention have the following advantages:

the alloyed lead weight of the cap is reduced, typically by 10 to 15%;

the tin weight can also be reduced;

the blanks cut from the complex strip produced are converted into a cap with conventional tools, e.g. using stamping-stretching or flow-spinning, the only special feature being that the plastics material surface which will form the interior of the capsule is kept dry;

the surprising effect of the double layer of plastics material both with regards to the shaping and for the protection against Pb migration.

EXAMPLES AND TESTS

First test

A metal strip was produced from a core strip with more than 98.5% alloyed lead and with a Sn content of 1.2% and Sb of <0.2%, as well as 99.4% alloyed Sn thin films containing 0.5% of Cu+Ni+Zn, each representing 0.8% of the thickness of the alloyed lead at the time of their application to the lead by colamination. The working ratio (=initial thickness/final thickness) was 26 and with a final thickness of 0.18 mm.

A metal strip was also produced on the basis of the same alloys, the alloyed Sn films only representing 0.3% of the alloyed lead thickness instead of 0.8%. It was surprisingly found that hot rolling performed under the same conditions took place without cracking or fracturing.

In the first case, under high magnification, on the rolled strip, it was found that the alloyed Sn surface layers have discontinuities leaving the alloyed Pb core uncoated and representing 10 to 15% of the surface. In the second case, these discontinuities represent approximately 40% of the surface.

Second test

On the basis of complexes produced from the second metal strip and three plastics material strips, all having a 5 μm EAA adhesive coating and 1 to 3 coextruded PE layers, caps were produced with an internal head diameter of 29.5 mm, a height of 50 mm and a conicity of 1/20. Variants were carried out with regards to the lubrication and the quality of the PE surface layer. Several caps corresponding to these various cases underwent tests with a WACO (registered trade mark) porosimeter.

The following drawing and ironing results were obtained:
no matter what the lubrication, the blanks with only a single PE layer led to cracking thereof during stretching or drawing out;
when the two faces of the blanks with two or three PE layers are lubricated in the conventional manner for such metal blanks, the latter also undergo cracking during drawing and ironing;
when only the metal face of the blanks with two or three PE layers is lubricated, the other face remaining dry, said blanks behave in a satisfactory manner during drawing and ironing;
the surface state is slightly better when the surface PE layer is based on low density PE and said layer is preferably also of commercial self-lubricated quality, the use of self-lubricated LDPE making it possible to obtain perfectly smooth inner surfaces for the caps.

In the WACO electric porosity test, a d.c. voltage of 6.3 V is passed between a cap provided with its inner coating and a central electrode, the conductive medium filling the cap being a 20% NaCl solution. The intensity (mA) passing is proportional to the total surface of the porosities of the tested surface and the results obtained can be summarized as follows:
caps with a single PE layer: 5 to 150 mA,
caps with 2 or 3 PE layers: less than 1 mA.

The sealing is inadequate for "more than 5 mA" and is good or perfect for "less than 1 mA".

Third test

Several hundred caps of different thickness were produced, corresponding to varying amounts of ironing, using a plastics material strip having three coextruded layers: 5 μm EAA + 10 μm PE + 10 μm LDPE. The plastics material face of the blanks was not lubricated for drawing and ironing.

First batch: complex strip of thickness 0.20 mm-825 caps with internal head diameter of 29.5 mm, height 50 mm and conicity 1/20, 300 of which underwent the electric porosity test.

Second batch: complex strip of 0.25 mm, 800 internal diameter 28.5 mm caps with a height of 55 mm and a conicity of 1/20, 250 of which underwent the electric porosity test.

Third batch: same complex strip as for the second batch, with 250 capsules of internal diameter 29.5 mm, height 75 mm and conicity 1/20 mm, 100 undergoing the electric porosity test.

All the caps are good and the results of the porosity test are all below 1 mA. These tests show that the process gives reproducible results and remains valid even for large cap heights (more extensive ironing).

Fourth series of tests

Pb migration tests: a given quantity of 2% acetic acid solution is placed in each cap and the latter is left for 48 hours. The acid is then collected and the Pb dosed into in accordance with the method of the O.I.V. (Office International de la Vigne et du Vin).

The results obtained on several caps without an internal coating and on caps with 2 PE layers are comparatively summarized as follows (15 to 20 caps of each type):
without internal coating: 2600 to 2900 mg of Pb/l,
2 PE layers: 4.16 to 9.22 mg of Pb/l.

It is possible to deduce from extrapolation from the known results obtained here:
for a Pb-based cap not internally coated with a plastic material and at the end of five years, the Pb migrations are between 10 and 500 μg/l with possible peaks up to 2,000 μg/l;
for a Pb-based cap coated with a single PE layer, the protection can be effective for about 18 months, but then Pb migrations into the uncoated cap take place;
for a Pb-based cap coated with 2 PE layers, the protection is better than for an internally uncoated cap, the migration (μg/l) being divided by 100 to 500 up to 5 years.

Hereinbefore, the expression "Pb-based cap" is used for the three standard layers: alloyed Sn film, alloyed lead and alloyed Sn film, the alloyed Sn film having discontinuities in the manner shown.

The tests of migration into acetic acid are the most significant and show the spectacular improvement linked with the two plastics material layers, in this case 10 μm PE layers, for the barrier layer and 5 or 10 μm for the surface layer.

I claim:
1. Process for the production of a lead-based capping cap, in which a metal strip is prepared by rolling which has an alloyed lead core with a lead content exceeding 95% and covered on each of its two faces with an alloyed tin film with a tin content exceeding 80%, characterized in that:
    (a) a multilayer plastics material strip is prepared having an adhesive plastics material surface layer and at least two successive layers of a plastics material selected from the group consisting of polyolefins, grafted polyolefins and terpolymers;
    (b) the two strips are joined by applying the adhesive face of the plastics material strip to one of the two faces of the metal strip, thus giving a complex strip;
    (c) from said complex strip is cut a blank and the latter is converted into a cap internally coated with plastics material.

2. Process according to claim 1, wherein the blank is converted into a cap by drawing and ironing or flow-spinning, whilst lubricating its metal face or the outer face of the cap and maintaining its plastics face or inner face dry.

3. Process according to claim 2, wherein the plastics material layer forming the inner surface of the cap is of self-lubricated polyolefin.

4. Process according to claim 3, wherein the prepared plastics material strip comprises, apart from its adhesive layer, two PE layers, the total thickness of said strip being between 10 and 40 μm.

5. Process according to claim 4, wherein the plastics material layer forming the inner surface of the cap is of self-lubricated LDPE.

6. Process according to claim 4, wherein the adhesive material layer of the multilayer plastics material strip is from one of the materials in the group formed by co-polymers of α-olefins and an unsaturated anhydride or acid, ionomers, or polyolefins grafted by an unsaturated anhydride or acid.

7. Process according to any one of the claims 1 to 5, wherein the metal strip is obtained by colaminating the alloyed lead blank with on each face an alloyed Sn strip with a thickness of 0.2 to 0.5% of the alloyed lead thickness.

8. Process according to claim 7, wherein the alloyed lead core has a composition (% by weight) of 0.1 to 1.5% Sn, <0.2% Sb, <0.2% impurities and Pb the remainder.

9. Process according to claim 8, wherein the alloyed Sn strip has a composition (% by weight) of Cu+Ni+Zn>0.2% with Cu<10%-Ni<3%-Zn<3.3%, impurities<0.2% and Sn the remainder.

10. Process according to claim 1, wherein the plastics material strip is faced on the metal strip by hot calendering, the facing point being remote from the heating zone and the surface temperature of the metal strip then being between 80° and 130° C.

11. Process according to claim 1, wherein the plastics material strip which, in the multilayer strip, is close to the adhesive layer is irradiated with a dose of 0.1 to 2 kGy.

12. Process for the production of a lead-based capping cap having a bottom and a skirt thinner than the bottom, with the following structure passing from the outside of the cap to the inside of the cap, in which a metal strip forming the outside of the cap is prepared by rolling which has an alloyed lead core with a lead content exceeding 95% and covered on each of its two faces with an alloyed tin film with a tin content exceeding 80%, each of the films having on at least 15% of its surface discontinuities which are visible under strong magnification leaving the lead core exposed characterized in that:

(a) a multilayer plastics material strip forming the inside surface is prepared having an adhesive plastics material surface layer and at least two successive layers of a plastics material selected from the group consisting of polyolefins, grafted polyolefins and terpolymers;

(b) the two strips are joined by applying the adhesive face of the plastics material strip to one of the two faces of the metal strip, thus giving a complex strip;

(c) from said complex strip is cut a blank and the latter is converted into a cap internally coated with the plastics material.

13. A process according to claim 12, wherein the plastics material coating comprises two successive PE layers.

14. A process according to claim 13, wherein the inner plastics material coating comprises an adhesive EAA coating, then a 7 to 25 μm thick PE layer and then a 3 to 10 μm thick PE layer.

* * * * *